(12) United States Patent
Schmidmer et al.

(10) Patent No.: US 7,664,231 B2
(45) Date of Patent: Feb. 16, 2010

(54) METHOD AND DEVICE FOR QUALITY EVALUATION OF AN AUDIO SIGNAL AND DEVICE AND METHOD FOR OBTAINING A QUALITY EVALUATION RESULT

(75) Inventors: Christian Schmidmer, Nuremberg (DE); Martin Kastner, Erlangen (DE); Michael Keyhl, Heroldsberg (DE)

(73) Assignee: Opticom Dipl.-Ing. Michael Keyhl GmbH, Erlangen (DE)

( * ) Notice: Subject to any disclaimer, the term of this patent is extended or adjusted under 35 U.S.C. 154(b) by 748 days.

(21) Appl. No.: 11/507,197

(22) Filed: Aug. 17, 2006

(65) Prior Publication Data

US 2006/0280313 A1      Dec. 14, 2006

Related U.S. Application Data

(63) Continuation of application No. PCT/EP2005/001215, filed on Feb. 7, 2005.

(30) Foreign Application Priority Data

Feb. 19, 2004    (DE) ........................ 10 2004 008 207

(51) Int. Cl.
*H04M 1/24* (2006.01)
*H04M 3/08* (2006.01)
*H04M 3/22* (2006.01)

(52) U.S. Cl. .................. 379/1.02; 379/1.01; 379/27.01; 370/241

(58) Field of Classification Search ................ 379/1.01, 379/1.02, 10.01, 15.03, 18, 22.02, 22.08, 379/23, 24, 26.02, 27.02, 27.03, 28, 29.11; 370/241, 247, 248, 252; 704/220, 226, 231, 704/246, 248; 700/94

See application file for complete search history.

(56) References Cited

U.S. PATENT DOCUMENTS 6,275,797 B1    8/2001  Randic ........................ 704/233

(Continued)

FOREIGN PATENT DOCUMENTS

EP          1 228 505 A0     8/2002

(Continued)

OTHER PUBLICATIONS

International Search Report for PCT/EP2005/001215, Jun. 5, 2005.

(Continued)

*Primary Examiner*—Quoc D Tran
(74) *Attorney, Agent, or Firm*—Thomas, Kayden, Horstemeyer & Risley, LLP

(57) ABSTRACT

A quality evaluation device for quality evaluation of an audio signal transmitted via an audio signal channel includes a unit for providing contacting information to a remote user, wherein the contacting information includes a contact address. A measurement server includes an interface designed to be a final point of the audio signal channel after an access with the contact address by the remote user, wherein a starting point of the audio signal channel is the remote user, and wherein the measurement server is further designed to subject the signal provided by the remote user via the audio signal channel to the quality measurement. The quality evaluation device further includes a unit for sending a quality evaluation result generated by the measurement server from the measurement server to the remote user. This allows any user able to access the measurement server, for example per internet, to evaluate and compare qualities with any terminals, any transmission channel settings, various telephone providers.

23 Claims, 4 Drawing Sheets

U.S. PATENT DOCUMENTS

| | | | |
|---|---|---|---|
| 6,985,559 B2 * | 1/2006 | Hardy | 379/1.02 |
| 7,130,273 B2 * | 10/2006 | Baj | 370/242 |
| 7,194,068 B2 * | 3/2007 | Page | 379/1.02 |
| 7,388,946 B1 * | 6/2008 | Mussman et al. | 379/15.01 |
| 7,420,928 B2 * | 9/2008 | Lobig | 370/248 |
| 2002/0167937 A1 * | 11/2002 | Goodman | 370/352 |
| 2005/0015253 A1 * | 1/2005 | Rambo et al. | 704/246 |

FOREIGN PATENT DOCUMENTS

| | | |
|---|---|---|
| EP | 1 328 106 A1 | 7/2003 |
| WO | WO 98/05179 | 2/1998 |
| WO | WO 00/72306 A1 | 11/2000 |
| WO | WO 00/72453 A1 | 11/2000 |
| WO | WO 02/43051 A1 | 5/2002 |
| WO | WO 02/078358 A1 | 10/2002 |
| WO | WO 2004/112002 A1 | 12/2004 |

OTHER PUBLICATIONS

International Telecommunication Union, Series P.800, "Methods for Subjective Determination of Transmission Quality," 37 pages, Aug. 1996.

International Telecommunication Union, Series P.800.1, "Mean Opinion Score (MOS) Terminology," 6 pages, Mar. 2003.

International Telecommunication Union, Series P.862, Amendment 1: "Amendment 1: Revised Annex A: Source Code for Reference Implementation . . . Tests," 12 pages, Mar. 2003.

International Telecommunication Union, Series P.830, Subjective Performance Assessment of Telephone-Band and Wideband Digital Codecs, 25 pages, Feb. 1996.

International Telecommunication Union, Series P.861, "Objective Quality Measurement of Telephone-Band (300-3400 Hz) Speech Codecs," 33 pages, Aug. 1996.

International Telecommunication Union, Series P.862, "Perceptual Evaluation of Speech Quality (PESQ): An Objective Method . . . Speech Codecs," 28 pages, Feb. 2001.

* cited by examiner

METHOD AND DEVICE FOR QUALITY EVALUATION OF AN AUDIO SIGNAL AND DEVICE AND METHOD FOR OBTAINING A QUALITY EVALUATION RESULT

CROSS-REFERENCE TO RELATED APPLICATION

This application is a continuation of copending International Application No. PCT/EP2005/001215, filed on Feb. 7, 2005, which designated the United States and was not published in English.

BACKGROUND OF THE INVENTION

1. Field of the Invention

The present invention relates to the field of quality evaluation of audio signals and particularly to quality evaluation systems suitable for practical use for everyone.

2. Description of the Related Art

Today, standardized perception-based measurement methods (perceptual measurement) are used for measurement-based evaluation of the quality of coded voice and audio signals. Known methods are the so-called PESQ method (PESQ=perceptual evaluation of speech quality) described in the standardization document ITU-T P. 862 (February 2001). Another known measurement method for quality evaluation is the so-called PEAQ method (PEAQ=objective measurements of perceived audio quality), which is presented in the standardization document Rec. ITU-R BS. 1387-1 (1998-2001). What these methods and/or further methods for quality evaluation have in common is that a signal to be tested ("test signal"), which is generally the output signal of a system or network or generally of an elements to be examined (DUT), is compared with an original or also reference signal, which is generally the input signal into the DUT to be tested.

Such a general "setting" is illustrated in FIG. 4. The original audio signal fed into a DUT 600 represents the reference signal or input signal, while the output signal after the DUT 600 is used to either perform a subjective hearing test with test persons, such as indicated by a subject 602, or to perform a quality evaluation method, such as PESQ or PEAQ, such as indicated by a model 604. By supplying the output signal from the DUT 600 to the subject 602, it is thus possible to perform a subjective hearing test typically performed with several test persons in standardized rooms. By supplying the original audio signal before the DUT 600, i.e. the reference signal, and the audio signal distorted by the DUT to the model 604, an objective test, i.e. an algorithmic evaluation without subjective test persons, may be performed.

The DUT 600 is typically a system whose influence on audio quality is to be evaluated. Such a system is, for example, a telecommunication connection and particularly a telephone connection that may be wireless or wired. An alternative DUT 600 is, for example, a coder/decoder path to evaluate the quality interference of a coding concept with downstream decoding concept. If the model operates in the intended way, the output of the model is supposed to be a prediction of the perceived quality that test persons would subjectively mark on a scale when hearing the output signal of the DUT 600.

In the case of the PESQ method, for example, the original audio signal, i.e. the audio signal before the DUT 600, which is the reference signal, is compared with the audio signal distorted by the DUT 600 considering a time delay, wherein a psychoacoustic model is used. In particular, both the original audio signal before the DUT 600 and the distorted audio signal after the DUT 600 are transformed into a so-called internal representation which is analogous to the psychophysical representation of audio signals in the human hearing system, wherein there are particularly considered parameters such as the Bark scale and the loudness (sone), as it is known in the art. The internal psychophysical representation of the original audio signal is then compared with the internal psychophysical representation of the distorted audio signal to calculate one or more error parameters, depending on the model, that allow a quantitative quality statement.

A quality evaluation method illustrated based on FIG. 4 is also referred to as "intrusive" method, because it is necessary to feed the reference signal, i.e. the original audio signal, into the system to be tested (DUT 600). At the output of the DUT, there is then obtained, as described above, the test signal to be evaluated, which is also referred to as distorted audio signal in FIG. 4 and/or generally as audio signal. The output of the DUT 600 may, for example, be the distant end of a telephone connection of two parties, wherein the original audio signal is fed in at the near end as reference signal. In this case, the measurement method, such as PESQ, would characterize the voice quality of a telephone connection.

As described, the algorithmic measurement methods are based on a combination of psychoacoustic and cognitive findings about the human hearing perception. The underlying experiment of these methods first consists in performing a subjective hearing test, in which a statistically sufficient number of test listeners ("subjects") is presented with a series of voice and/or audio sequences for evaluation. The testers evaluate these sequences by means of a discrete and/or continuous quality scale, which is also referred to as "opinion scale" in the art and ranges, for example, from 1 ("bad") to 5 ("excellent"). Such subjective hearing tests are, for example, presented in the standardization document ITU-T P.800 (August 1996).

Consistently, test sequences are prescribed in standardized test procedures, such as in the standardization document Rec. ITU-R BS.1116-1 or Rec. ITU-R BS.1534, that have a duration of typically between 8 and 12 seconds, whose maximum length, however, does not exceed 20 seconds. Although these test sequences are real signals, they are not stochastic and/or randomly originating from a real scenario, but standardized predetermined test sequences that may be fed into the DUT to be considered in an experiment to gain the test input signal, i.e. the audio signal distorted by the DUT.

Recently, developments have been presented that allow to perform non-intrusive tests, too, which are supposed to allow an estimation of the voice quality exclusively based on an analysis of the test signal on the reception side, i.e. without feeding in a reference signal on the transmission side. Such developments are particularly advantageous for practical realizations, because they allow, for example, a statement on the voice quality of a mobile radio connection solely in the terminal without requiring any measurement arrangements or measures and/or manipulations in the telephone network for feeding in a reference signal. Each real telephone conversation may thus, in principle, be subjected to a quality evaluation with such a non-intrusive concept.

Since both intrusive measurement methods and particularly non-intrusive measurement methods by now provide significant results, as it is also documented by the quickly advancing standardization, there is still the problem how such a system may be made available to the general public.

Non-intrusive measurement methods lend themselves better to this purpose, because they at least require only the output signal of the DUT channel 600 (FIG. 4), while intrusive measurement methods additionally require the original audio signal not distorted by the channel.

In addition, the audio signal distorted by a channel has to be provided to the measurement device for a quality evaluation of audio signals, wherein at the same time the quality evaluation concept is to be available not only for a few special applications, such as in a laboratory of a telephone company, but that, in principle, everyone may access the inventive quality evaluation concept to be able to perform a quality evaluation of audio signals they generated.

SUMMARY OF THE INVENTION

It is the object of the present invention to provide a quality evaluation concept that is flexible in its application and easily achieved.

In accordance with a first aspect, the present invention provides a device for quality evaluation of an audio signal transmitted via an audio signal channel, having a unit for providing contacting information to a remote user, wherein the contacting information includes a contact address; a measurement server for quality measurement of the audio signal, wherein the measurement server has a server interface designed to be a final point of the audio signal channel after an access with the contact address by the remote user, wherein a starting point of the audio signal channel is the remote user, and wherein the measurement server is designed to subject the signal provided by the remote user via the audio signal channel to the quality measurement; and a unit for sending a quality evaluation result generated by the measurement server from the measurement server to the remote user.

In accordance with a second aspect, the present invention provides a device for obtaining a quality evaluation result from a quality measurement of an audio signal transmitted via an audio signal channel, having a unit for sending an activation signal to a remotely located quality evaluation device by a user, wherein the activation signal includes an address of the user; a unit for receiving contacting information from the quality evaluation device in response to sending the activation signal, wherein the contacting information includes a contact address of the quality evaluation device; a unit for establishing the audio signal channel between the user and the quality evaluation device using the contact address; a unit for sending the audio signal from the user via the audio signal channel to the remote quality evaluation device; and a unit for receiving quality evaluation results from the remote quality evaluation device.

In accordance with a third aspect, the present invention provides a method for quality evaluation of an audio signal transmitted via an audio signal channel, having the steps of providing contacting information to a remote user, wherein the contacting information includes a contact address; initiating the establishment of the audio signal channel using the contact address, wherein an interface of a measurement server is a final point of the audio signal channel after an access with the contact address by the remote user, and wherein a starting point of the audio signal channel is the remote user; subjecting the audio signal to a quality measurement; and sending a quality evaluation result generated by the measurement server from the measurement server to the remote user.

In accordance with a fourth aspect, the present invention provides a method for obtaining a quality evaluation result from a quality measurement of an audio signal transmitted via an audio signal channel, having the steps of sending an activation signal to a remotely located quality evaluation device by a user, wherein the activation signal includes an address of the user; receiving contacting information from the quality evaluation device in response to sending the activation signal, wherein the contacting information includes a contact address of the quality evaluation device; establishing the audio signal channel from the user to the quality evaluation device using the contact address; sending the audio signal from the user via the audio signal channel to the remote quality evaluation device; and receiving quality evaluation results from the remote quality evaluation device.

In accordance with a fifth aspect, the present invention provides a computer program with a program code for performing the above-mentioned method for quality evaluation, when the computer program runs on a computer.

In accordance with a sixth aspect, the present invention provides a computer program with a program code for performing the above-mentioned method for obtaining a quality evaluation result, when the computer program runs on a computer.

The present invention is based on the finding that quality evaluation concepts for the evaluation of an audio signal transmitted via an audio signal channel are made flexible and easily accessible by providing them on, for example, an internet platform so that any user having internet access may readily access the online measurement system.

The users only have to know that there is such a measurement system and at which internet address they may access the measurement system. Thereupon, the quality evaluation device may easily send contacting information including a contact address to the computer that accessed the platform. This contact address is preferably a telephone number of a measurement server, which may, of course, also be remote from the position at which the internet platform is physically located.

Then, the user may establish the audio signal channel to be evaluated by dialing-in at the measurement server, i.e. the actual measurement device, by means of the contact address. For this purpose, the measurement server has an interface designed to be a final point of the audio signal channel after an access with the contact address by the remote user, while the starting point of the audio signal channel is the remote user.

After dialing-in and activation of the measurement routine, of course again instructed by the measurement server, and preferably by automatic announcement of the measurement server with a request to now generate the audio signal actually to be evaluated, the remote user generates the audio signal at his/her position by means of a telephone, a player, etc., wherein this audio signal is then transmitted via the channel from the remote user to the measurement server via the telephone interface of the measurement server and is preferably subjected to a quality measurement by a non-intrusive measurement method in the measurement server.

When the measurement server has completed its quality evaluation, it may readily return the measurement results to the user, because it still has the address of the user, because the user had accessed the internet platform constituting the communication interface of the measurement server. The measurement server thus returns the results to the computer of the user or also, per SMS, onto a mobile phone of the user, such that the user obtains an immediate feedback on the quality of his/her audio signal channel. There may, however, also be two different devices, i.e. a device that measures and another device that returns the results to the user.

Assuming that the transmission channel itself, i.e. the telephone line to the server, is a relatively good channel, and further assuming that the main quality interference is not provided by this channel, but by a terminal of the user, such as his/her wireless home mobile phone, his/her normal GSM or UMTS mobile phone or an audio decoder he/she uses, such as an MP3 player, the user may directly obtain a statement on the quality of these different terminals.

This, of course, also applies to other communication devices of the user that generate audio signals and may be transmitted to the measurement server, and of which a quality measurement is desired.

The present invention is advantageous in that everyone may perform a quality evaluation themselves with the own spoken audio signal, so that the users may have high confidence in the output measurement result, because they have witnessed the measurement themselves and delivered the evaluated audio signal themselves, for example by speaking if the telephone connection was tested, or by replaying if a decoder quality is to be evaluated. In addition, it is preferred to give the user the possibility to listen to the evaluated sequence(s) after completion of the test, which increases the credibility for the user.

A further advantage of the present invention is that the user may achieve a simple and self-realized comparison of the voice quality of various providers, operators, networks and terminals by performing various measurements, for example with various telephone area code numbers.

A further advantage of the present invention is that the users may obtain direct feedback on any channel they may choose at any time and preferably directly after completion of the measurement.

A further advantage of the present invention is that the audio signal provided by the user is itself used for a fully automatic measurement with a real voice piece, which again increases the credibility of the measurement for the user. In addition, it has been found to be advantageous to provide the users with a suggestion for the voice sequence within the contacting information, so that the users put aside their reluctance to say something into a telephone, not knowing exactly what.

Furthermore, providing a written voice sequence has the advantage that the users achieve good comparability when they want to compare various terminals/networks, providers, etc. and use the same voice sequence for the test of each different setup.

In a preferred embodiment of the present invention, the measurement method performed by the measurement server is a non-intrusive method for measuring the quality of the audio signal.

Furthermore, it is preferred to prepare the raw audio material into test sequences approximately conforming to the hearing test before the actual measurement. This procedure is for being able to feed any audio signal into the measurement system. This significantly increases the operability of the measurement method and thus also the acceptance by customers who do not have to be audio specialists.

In a preferred embodiment, the inventive concept is thus characterized by the fact that the initially completely separated and unsynchronized processes of the telephone conversation to be tested, the measurement of the voice quality of an underlying channel and a report of the results to the user are coordinated, wherein, according to the invention, there is particularly considered the fact that there is a not insignificant geographical distance between the source, i.e. the party responsible for the test call, i.e. the user, and the location of the determination of the voice quality and possibly also the location of the internet platform. In this context, it is to be noted that, for quality measurement, the measurement server measures the quality how the voice signal (listening quality) of the user is perceived at the distant end as seen from the user, i.e. at the measurement server.

BRIEF DESCRIPTION OF THE DRAWINGS

Preferred embodiments of the present invention will be explained in detail in the following with respect to the accompanying drawings, in which.

DESCRIPTION OF THE PREFERRED EMBODIMENTS

Figure 1:
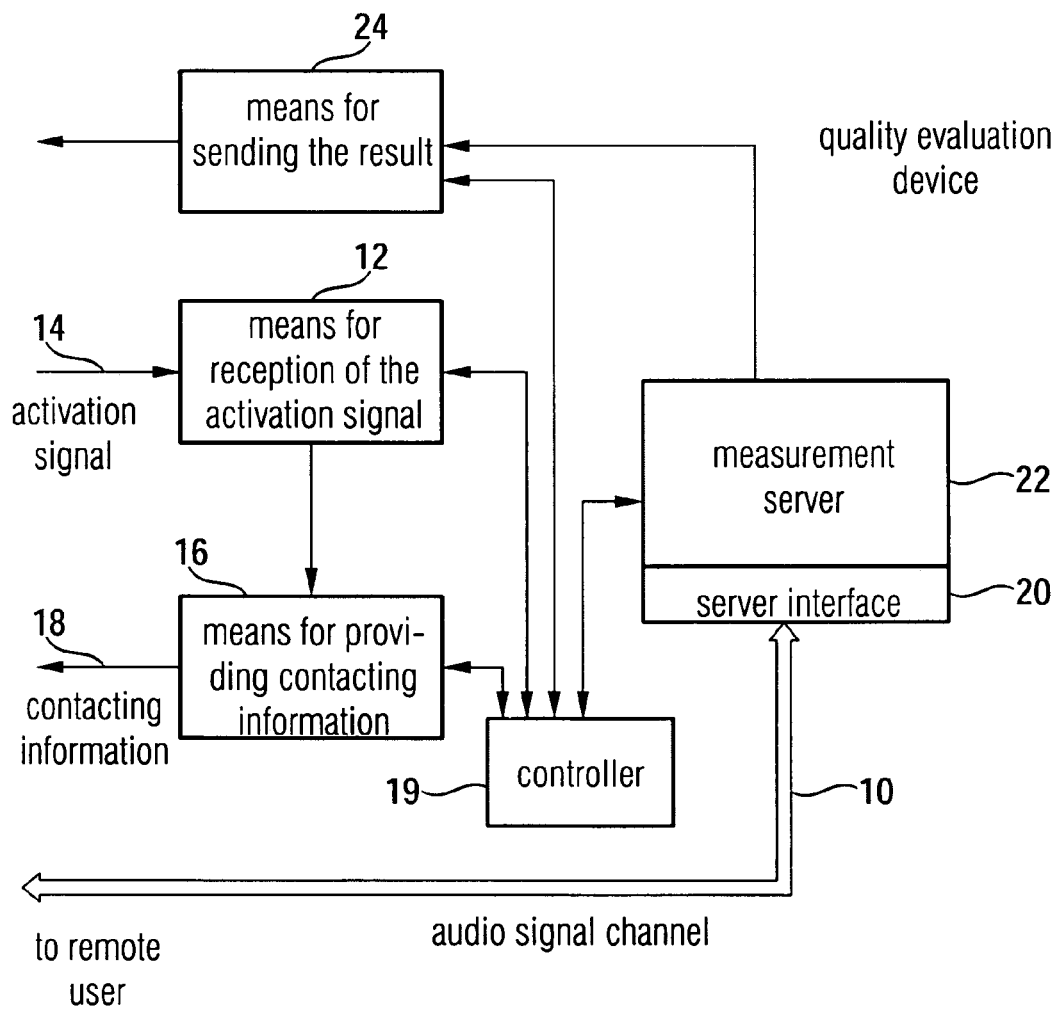
FIG. 1 shows a block circuit diagram of an inventive device for quality evaluation.

FIG. 1 shows a block circuit diagram of the inventive concept by means of an example of an inventive device for quality evaluation of an audio signal transmitted via an audio signal channel 10. The inventive device includes means 12 for receiving an activation signal 14 from a remote user. In response to the reception of the activation signal, means 16 for providing contacting information 18 including a contact address from the inventive device to the remote user is implemented. When they have the contacting information 18, the users are capable of establishing the audio signal channel 10 from their position, i.e. from their terminal, to a server interface 20 communicating with a measurement server performing the actual quality measurement and indicated by the reference numeral 22. In particular, the interface 20 is designed to be a final point of the audio signal channel after an access with the contact address by the remote user, wherein this access is, for example, a dial-in, wherein a starting point of the audio signal channel is the remote user.

The measurement server 22 is further designed to subject the signal supplied by the remote user via the audio signal channel 10 to the quality measurement.

The inventive quality evaluation device further includes means 24 for sending a quality evaluation result generated by the measurement server to the remote user.

Depending on the implementation, the means 24 for sending the result may operate to use, for example, the internet channel between the computer of the user and the means 12 and 16. Alternatively, however, the means 24 may also return the measurement results to the user via the audio signal channel 10. However, this is not preferred, because in that case the user would have to stay on the telephone. Therefore, it is preferred to use the internet channel also used by the means 12 and 16 by the means 24, or to contact the user, for example per SMS or email, on his/her mailbox, his/her mobile phone or his/her landline telephone.

The inventive concept allows its massive use for measurement-based evaluation of real telephone connections. Particularly using non-intrusive methods on the measurement server, the present invention allows to now test the voice quality at nearly any point in the network without requiring the knowledge of a reference. This additional freedom of the measurement technique advances the distribution of this measurement technique.

Preferably, the measurement server 22 uses mechanisms that, in addition to the measurement method 20, put the raw voice signal to be measured into a form suitable for measurement, for example such concepts that format the voice signal to sequences of a length of 8 to 20 seconds and guarantee a possibility of returning, for example, the measured quality of the connection to the interested person.

For purposes of the extraction of a test signal portion, the time structure of the audio signal is first analyzed to distinguish an information-carrying portion of the audio signal from a preceding non-information-carrying portion of the audio signal and a following non-information-carrying portion of the audio signal. Based on the analysis of the audio signal with respect to the detection of the information-carrying portions, there is then generated a test signal portion based on the information-carrying portion of the audio signal. This means the abandonment of the procedure of the fixed division into adjacent signal portions. Test signal portions are now acquired so that the audio signal is subjected to a signal analysis with respect to its time structure and with respect to its information content to gain, based on the findings thus acquired, signals portions, i.e. test signals portions, for further processing that largely correspond to those of test sequences conforming to hearing tests. The fragmentation of the audio signal into test signal portions is thus not done independent of the signal, but in a signal-adapted way.

An advantage is that the audio signal-adaptive extraction of a test signal portion results in avoiding system-immanent artifacts. Instead, test signal portions conforming to hearing tests are acquired that allow the application and distribution of non-intrusive measurement concepts.

A further advantage is that no DUT modifications and/or reference signals are required, but that the concept generates test signal portions from real audio signals, which are manipulatable to a large extent with respect to their criteria typically predetermined by hearing tests.

In a preferred embodiment of the present invention, the analysis of the audio signal is done by voice activity detection, pause detection and/or noise detection or downstream voice detection.

The test signal portion may directly contain a complete information-carrying portion of the audio signal, if the time lengths are sufficient. Depending on the implementation, however, there may also be done a manipulation of an information-carrying portion of the audio signal to add, for example, pauses at the beginning and at the end of an information-carrying portion to generate a predefined relation of, for example, voice modulation to, for example, pause.

By providing a predetermined minimum value for the time length of the test signal portion and a predetermined maximum value for the time length of a test signal portion, it is possible in a preferred embodiment of the present invention to generate test signals portions conforming to hearing tests even from longer information-carrying portions, preferably by slow fading in and fading out, the portions being substantially free of artifacts, because the unnatural fast turning on and/or off of an information-carrying portion is concealed.

The described pre-processing is particularly advantageous in that it transforms any audio signal typically having long pauses into a sequence of test signal portions each of which consists of a specifiable minimum percentage of an information-carrying portion of the audio signal. This means that the typical long pauses are cut out automatically, so to speak. A quality evaluation of the transmission channel from which the audio signal originates then performs this quality evaluation only with useful test signal portions and does not uselessly waste resources by the futile attempt of quality evaluation of pauses of a party, for example, in a telephone conversation.

Figure 2:
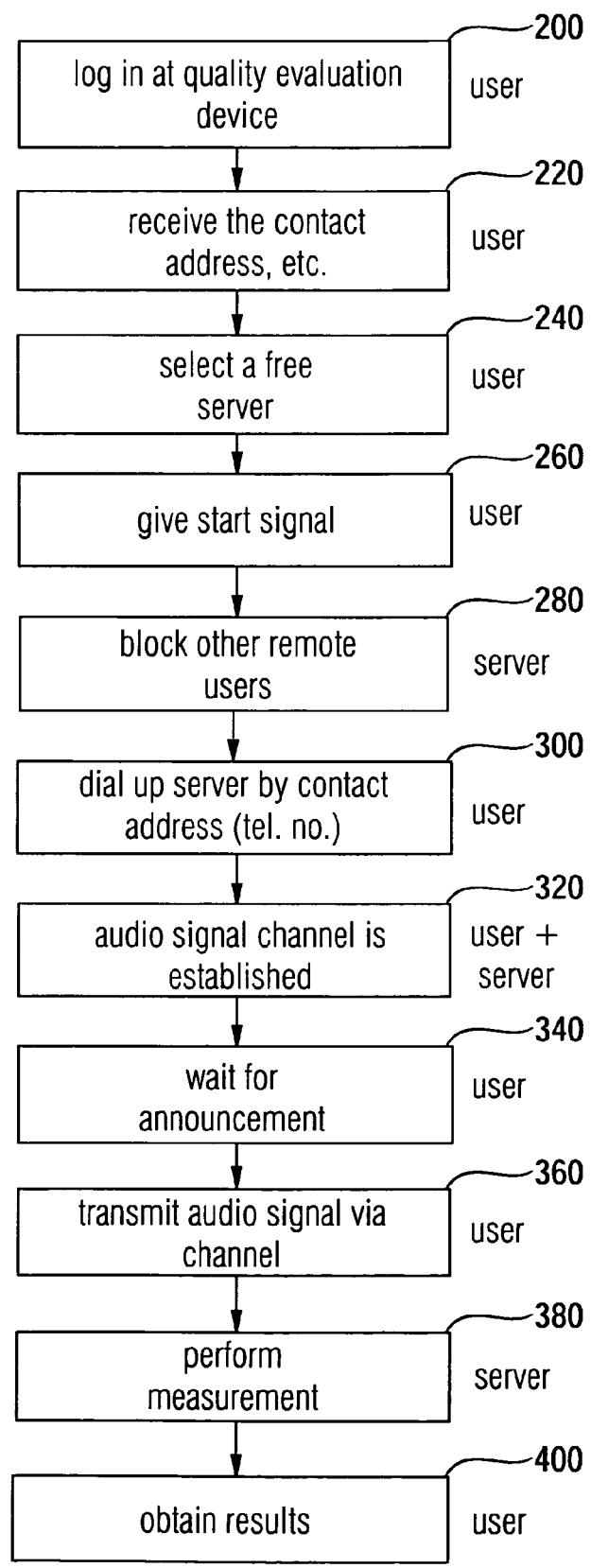
FIG. 2 shows a flow diagram for the representation of the operation of a device for obtaining a quality evaluation result according to a preferred embodiment of the present invention.

The following will describe a flow diagram of the operation of a preferred device for obtaining a quality evaluation result by a remote user from the user perspective with respect to FIG. 2.

It is to be noted that the user perspective is a mirror image with respect to the quality evaluation device perspective. Thus, in FIG. 2, there is an indication next to each block whether this step is performed by the user or by the quality evaluation device (server).

The "mirror image aspect" can be illustrated, for example, in the second block, which is illustrated with "receive the contact address". Thus, from the point of view of the user, the significant step at this point is that the contact address is received. However, from the point of view of the server, the significant step is that the contact address is sent (by the means 16 of FIG. 1).

The mirror image aspect is similar, for example, for the next step indicated by "select a free server". The user selects the free server, for example by marking on a website. Mirror image-wise, this means for the server that it registers the user selection and implements it correspondingly.

First, the user will log in at the quality evaluation device (20). This occurs when, for example, a computer of a user dials up the URL (web address) of the measurement server and/or an internet interface of the measurement server. Then, this internet interface of the measurement server sends data to the computer, so that the computer displays the website. Among these data from the internet interface of the measurement server, there is the contact address of the actual measurement server, which the user receives when the website data are received and displayed (22).

Preferably, there are various measurement servers that may be dialed up by different telephone numbers. In a preferred embodiment of the present invention, there is a button in front of each entry for a measurement server, which is selected, for example, by the user clicking on it such that the user informs the internet interface of the measurement server that he/she intends to communicate with this server. Next to a server symbol, there is also the telephone number of the server interface 20 (FIG. 1) in the embodiment. Depending on where the position of the server dialed up is located, national, local, but also high-range international communication connections may be checked. If, for example, a server in the United States is dialed up to perform the quality evaluation, the telephone line, i.e. the audio signal channel 10 of FIG. 1, from the remote user to the server in the United States is subjected to quality evaluation by subjecting the audio signal received by the measurement server via the server interface 20 of FIG. 1 to the quality measurement.

After the user has selected the free server (240), which he/she is able to do due to availability information which is also part of the contacting information, the user is supplied a feedback such that he/she gets a confirmation that the server has really been selected and is available for measurement.

Then, the user may give a start signal (260), which he/she may, for example, do by clicking on a start test button with the mouse. In this case, the content of the active website changes to show the status of the current test. In this case, the status would consist in informing the user that the test has been started. On the server side, a blockade is performed after starting the test such that no other users may access the same server with the same connection and/or contact data (280).

In a preferred embodiment of the present invention, the user now gets a signal on the website that he/she is to dial up the telephone number associated with the selected server as contact address. The user then dials up this contact address (300) such that the audio signal channel 10 (FIG. 1) is now generated between the terminal of the user and the server interface 20 (FIG. 1) (320) by common signaling protocols, such as they are typical for an analog telephone connection, an ISDN telephone connection, another communication connection. As soon as the audio signal channel has been established, a welcome announcement is supplied to the user by the server. The user has to wait for the duration of this announcement until typically there is a "beep" so that the user may now speak the audio signal to be tested with respect to its quality into his/her terminal and/or replay it from his/her terminal, so that it is transmitted via the channel, probably affected in its quality by the channel, and is then supplied to the measurement server 22 via the server interface for measurement.

After the transmission of the audio signal via the channel (360), the measurement is thus performed (380), wherein the measurement device, as discussed, still performs pre-processing before the actual quality evaluation such that audio signal portions conforming to hearing tests are extracted from the raw audio signal, as they are recommendable for one of the mentioned preferably non-intrusive standard quality evaluation methods. After the measurement has been performed, the quality evaluation results are output by the measurement server and finally obtained by the user (400).

In a preferred embodiment, the user is asked in the announcement in step 340 or by the general contact information in step 220 to speak, for example, at least for 8 seconds and at the most, for example, for 1 minute, wherein it is preferred that the user pauses at least twice. Furthermore, it is pointed out to the user that he/she may speak in any language and that he/she may choose the spoken words freely. However, a voice sequence is suggested to the user which is particularly useful when the user wants to test various devices or providers to have a comparison. If the speaking is always done with the same test sequence, the result is that the quality evaluation results do not depend on the spoken sequence.

After the test call has been completed, the user thus simply has to hang up the phone and wait until the processed results are ready and are typically displayed on his/her computer.

In order to ensure that it is not possible for everyone currently on the website to see the quality results of a user, it is preferred that the user uses an individual account when logging in (step 200 in FIG. 2), which is protected by a password selected by the user, so that no user may see the results of another user or possibly influence a test performed by a user by his/her own sequences, etc. This further ensures the reliability of the inventive concept, wherein the reliability is of particular importance here, because according to the present invention the user is not standing "right beside to the measurement server", but has to trust in what happens "backstage", i.e. where the measurement server is actually located.

Figure 3:
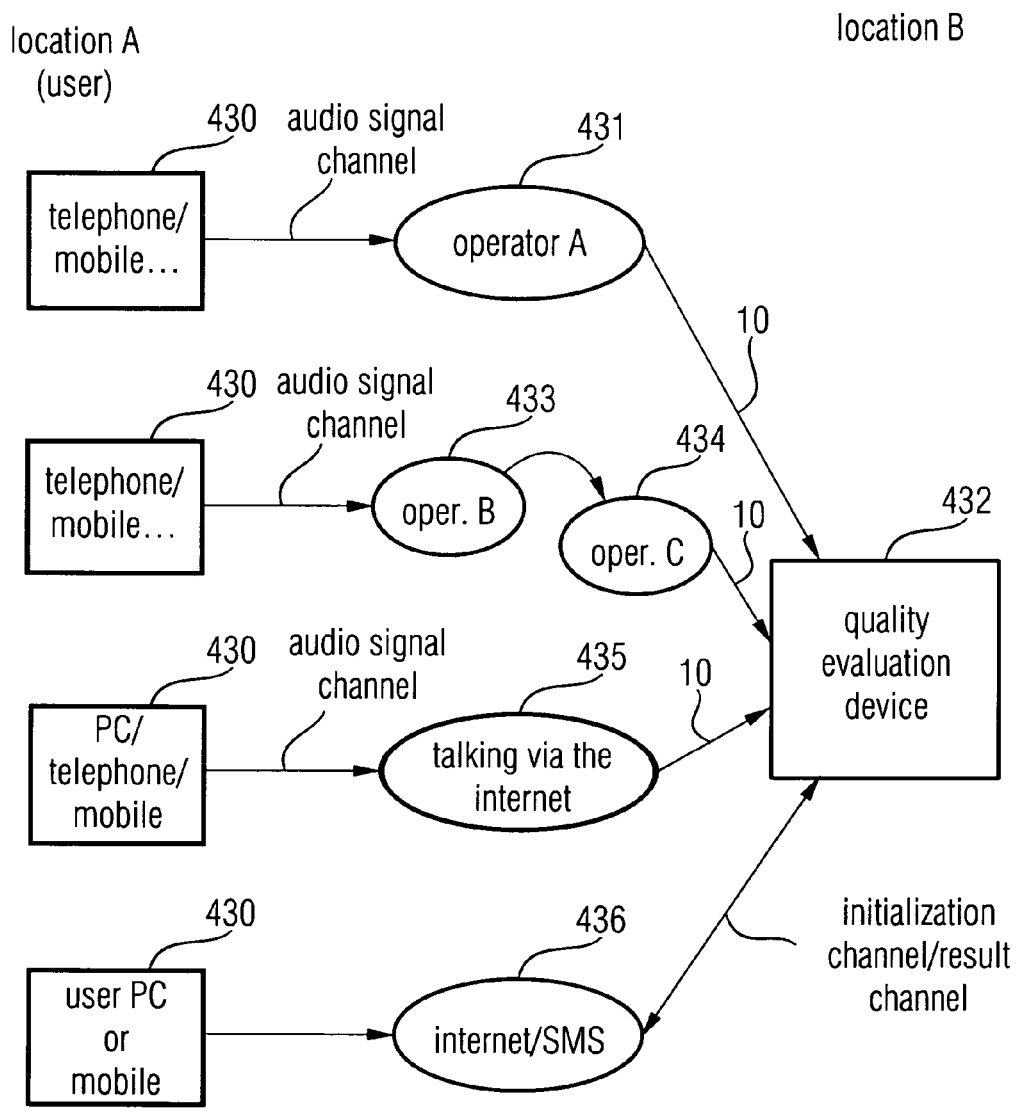
FIG. 3 shows a scenario representation of the inventive concept with various audio signal channels and one signaling channel.
Figure 4:
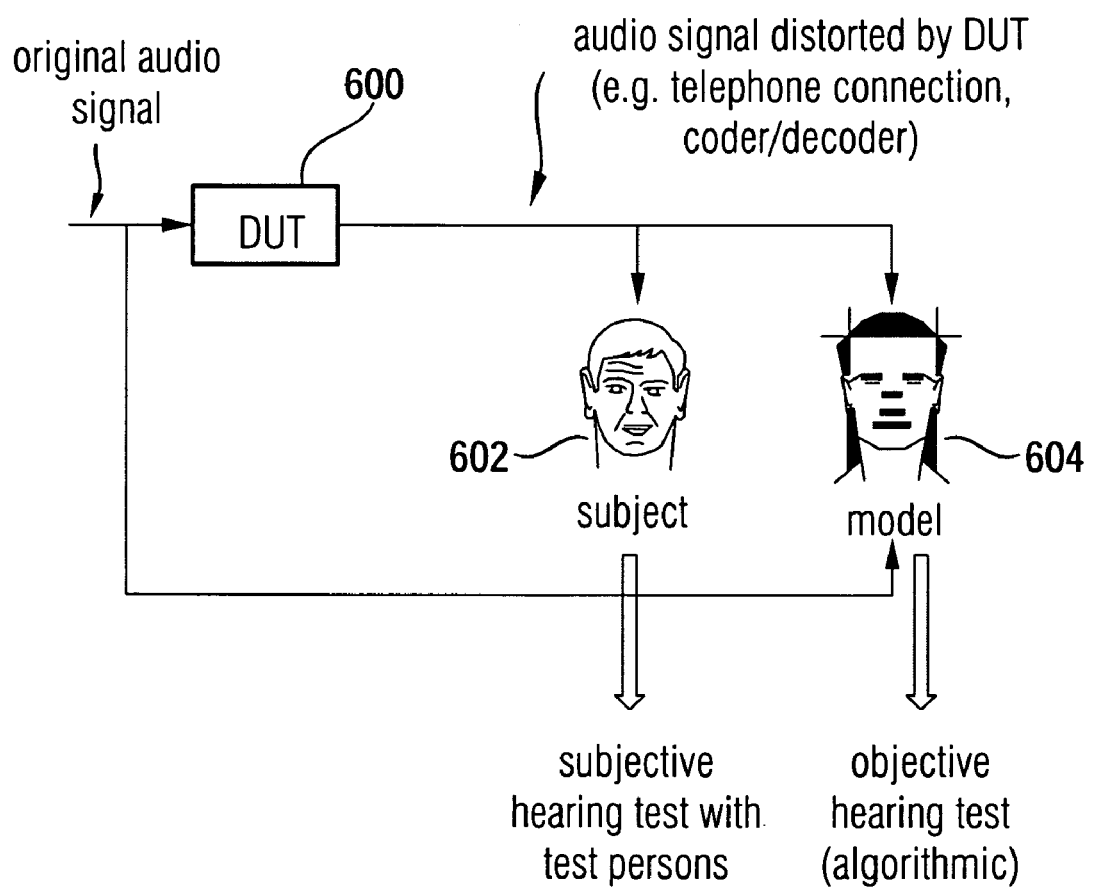
FIG. 4 shows an overview diagram for the illustration of the basic operation of an intrusive hearing test for quality evaluation of a system to be tested.

The following will illustrate a possible scenario with respect to FIG. 3 to illustrate the various audio signal channels that may be evaluated in their quality by the inventive concept. First, a user may contact the quality evaluation device 432 via the audio signal channel 10 by means of a telephone, mobile phone, etc. 430 via a single operator 431. This would be the case when both the quality evaluation device 432 and the user 430 are connected to the same network provider and thus only a single operator 431 is involved.

In another case, the user 430 would dial, for example, a certain telephone area code to be connected first to an operator 433 that passes on to an operator 434 when the call is, for example, an international call, i.e. when the quality evaluation device 432 is located in another country, to evaluate, for example, a long-range telephone connection with respect to its quality.

Alternatively, the audio signal channel may also be a "voice over IP" channel, i.e. a voice channel in the internet 435, that is to be evaluated with respect to its quality.

Between the quality evaluation device 432 and the user 430, there is further an initialization channel/result channel via which the means 24, 12 and 16 of FIG. 1 are active. This initialization channel is preferably the internet 436 or an SMS channel. Alternatively, this channel may, however, also be the audio signal channel evaluated with respect to its quality itself, wherein it is preferred, however, to take a channel that is not connection-oriented as initialization channel/result channel, because it may be set up in a more simple and easy way, and to take a connection-oriented channel only as audio signal channel.

Depending on the circumstances, the inventive method may be implemented in hardware or in software. The implementation may be done on a digital storage medium, particularly a floppy disk or CD with control signals that may be read out electronically, which may cooperate with a programmable computer system so that the method is performed. Generally, the invention thus also consists in a computer program product with a program code stored on a machine-readable carrier for performing the inventive method, when the computer program products runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for quality evaluation of an audio signal transmitted via an audio signal channel, comprising:
   a unit for providing contacting information to a remote user, wherein the contacting information includes a contact address;
   a measurement server for quality measurement of the audio signal, wherein the measurement server comprises a server interface designed to be a final point of the audio signal channel after an access with the contact address by the remote user, wherein a starting point of the audio signal channel is the remote user, and wherein the measurement server is designed to subject the signal provided by the remote user via the audio signal channel to the quality measurement; and
   a unit for sending a quality evaluation result generated by the measurement server from the measurement server to the remote user.

2. The device of claim 1, wherein the unit for providing is designed to further provide an example text as contacting information, which may be used by the remote user to generate the audio signal to be transmitted via the audio signal channel on the user side.

3. The device of claim 1, wherein there is further present a unit for receiving an activation signal from a user designed to receive an access of the remote user via the internet as activation signal.

4. The device of claim 1, wherein the unit for providing is designed to send the contacting information as image information to the remote user.

5. The device of claim 1, wherein the unit for providing is designed to provide a busy/not busy status of the measurement server to the remote user as further contacting information.

6. The device of claim 1, wherein the unit for providing is further designed to send a request message to the remote user and to further send a feedback message to the remote user signaling to the remote user that the remote user has reacted positively to the request message.

7. The device of claim 1, further comprising a controller designed to block the measurement server for activation signals from other users in the case of a starting request received from the remote user.

8. The device of claim 1, wherein the audio signal channel is a telephone connection, and wherein the contact address is a telephone number of the measurement server.

9. The device of claim 1, wherein the audio signal includes a voice message spoken by the remote user.

10. The device of claim 1, wherein the measurement server is designed to send a verbal welcome message to the remote user after an access, by which the user is asked to generate the audio signal.

11. The device of claim 1, wherein the measurement server is designed to perform the quality measurement non-intrusively.

12. The device of claim 1, wherein the measurement server is designed to extract one or more test signal portions with predetermined properties from the audio signal received from the remote user, and then to perform the quality measurements with the one or more test signal portions.

13. The device of claim 1, wherein the unit for sending is designed to send the quality evaluation results to the remote user via the internet or per SMS.

14. The device of claim 1, wherein the unit for receiving, the unit for providing, and the unit for sending are designed to communicate with the remote user via a communication channel which is different from the audio signal channel.

15. The device of claim 1, wherein the audio signal channel is a connection-oriented communication channel between the remote user and the measurement server.

16. The device of claim 1, wherein the audio signal channel includes an ISDN channel, an analog telephone channel, a radio path, a coder/decoder path or an internet telephony channel.

17. The device of claim 1, further including a unit for receiving an activation signal from a remote user, and
wherein the unit for providing contacting information is designed to provide the contacting information to the user from where the activation signal originated, in response to the activation signal.

18. The device of claim 17, wherein the activation signal includes an address of the user where the contacting information is supplied to.

19. A device for obtaining a quality evaluation result from a quality measurement of an audio signal transmitted via an audio signal channel, comprising:
a unit for sending an activation signal to a remotely located quality evaluation device by a user, wherein the activation signal includes an address of the user;
a unit for receiving contacting information from the quality evaluation device in response to sending the activation signal, wherein the contacting information includes a contact address of the quality evaluation device;
a unit for establishing the audio signal channel between the user and the quality evaluation device using the contact address;
a unit for sending the audio signal from the user via the audio signal channel to the remote quality evaluation device; and
a unit for receiving quality evaluation results from the remote quality evaluation device.

20. A method for quality evaluation of an audio signal transmitted via an audio signal channel, comprising:
providing contacting information to a remote user, wherein the contacting information includes a contact address;
initiating the establishment of the audio signal channel using the contact address, wherein an interface of a measurement server is a final point of the audio signal channel after an access with the contact address by the remote user, and wherein a starting point of the audio signal channel is the remote user;
subjecting the audio signal to a quality measurement; and
sending a quality evaluation result generated by the measurement server from the measurement server to the remote user.

21. A method for obtaining a quality evaluation result from a quality measurement of an audio signal transmitted via an audio signal channel, comprising:
sending an activation signal to a remotely located quality evaluation device by a user, wherein the activation signal includes an address of the user;
receiving contacting information from the quality evaluation device in response to sending the activation signal, wherein the contacting information includes a contact address of the quality evaluation device;
establishing the audio signal channel from the user to the quality evaluation device using the contact address;
sending the audio signal from the user via the audio signal channel to the remote quality evaluation device; and
receiving quality evaluation results from the remote quality evaluation device.

22. A computer program with a program code for performing the method for quality evaluation of an audio signal transmitted via an audio signal channel, when the computer program runs on a computer, the method comprising providing contacting information to a remote user, wherein the contacting information includes a contact address; initiating the establishment of the audio signal channel using the contact address, wherein an interface of a measurement server is a final point of the audio signal channel after an access with the contact address by the remote user, and wherein a starting point of the audio signal channel is the remote user; subjecting the audio signal to a quality measurement; and sending a quality evaluation result generated by the measurement server from the measurement server to the remote user.

23. A computer program with a program code for performing the method for obtaining a quality evaluation result from a quality measurement of an audio signal transmitted via an audio signal channel, when the computer program runs on a computer, the method comprising sending an activation signal to a remotely located quality evaluation device by a user, wherein the activation signal includes an address of the user; receiving contacting information from the quality evaluation device in response to sending the activation signal, wherein the contacting information includes a contact address of the quality evaluation device; establishing the audio signal channel from the user to the quality evaluation device using the contact address; sending the audio signal from the user via the audio signal channel to the remote quality evaluation device; and receiving quality evaluation results from the remote quality evaluation device.

* * * * *